Jan. 16, 1940.  W. A. R. MEYER  2,186,963
DEVICE FOR USE IN CONNECTING WIRE ENDS
Filed March 24, 1938
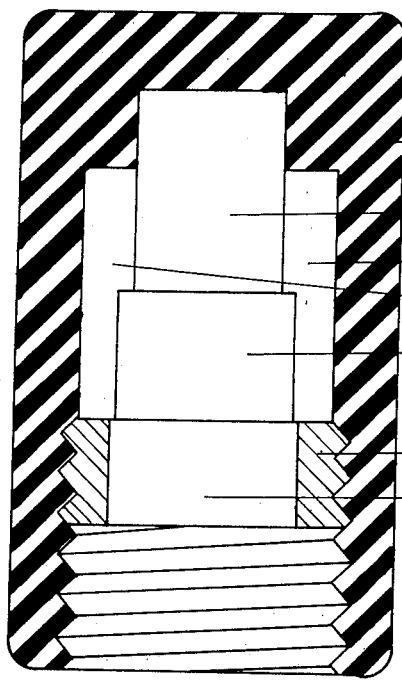
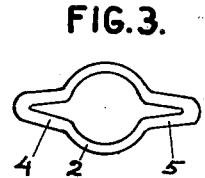
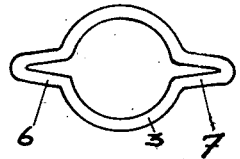
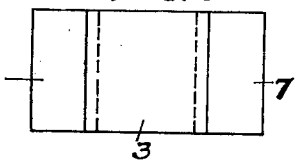
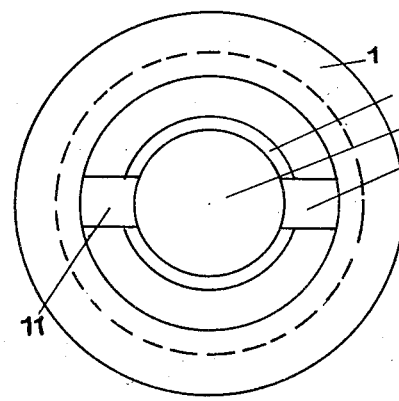
INVENTOR.
WILHELM ALBERT RUDOLPH MEYER
BY Maxwell E. Sparrow
ATTORNEY Patented Jan. 16, 1940

2,186,963

UNITED STATES PATENT OFFICE 2,186,963

DEVICE FOR USE IN CONNECTING WIRE ENDS

Wilhelm Albert Rudolph Meyer, The Hague, Netherlands, assignor to Thabur, Industrieele en Technische Handelmaatschappij N. V., The Hague, Netherlands Application March 24, 1938, Serial No. 197,881 In the Netherlands February 17, 1937

5 Claims. (Cl. 174—87)

This invention relates to a device for use in connecting wire ends, particularly the cleaned ends of electric wires which are twisted together.

In known devices for this purpose the intertwisted wire ends are generally screwed in a conically narrowing bore of a member utilized as an insulating cap. The intertwisted wire ends, however, form a mainly cylindrical body. In consequence thereof the contact surface between the wire ends and the conical wall of the bore is rather small and the cap can easily become loose. In order to meet this objection the twisted wire ends are often screwed into a conical spiral spring, but then it is not possible to remove the spring undamaged from the wire ends, which causes difficulties when inspecting the wiring.

An object of the invention is to overcome these objections and to provide a wire connector in which the contact surface between the wire ends and the fixing means is relatively large, whereas said means can nevertheless be easily removed and cannot become loose by vibrations or like causes.

A further object of the invention is to provide a device which is cheap in manufacture, easy to handle and of compact construction.

According to the invention this is obtained by producing the wire connecting device mainly as an insulating body with two or more cylindrical continuous coaxial bores of different diameter, in each of which a cylindrical clamping ring may be arranged for the wire ends to be connected; the said clamping rings being of various diameters and lying in the corresponding cylindrical bores of the insulating body. The wire connector thus functions to connect various numbers of wires and even wires of various diameters.

In order to increase the number of connection possibilities still more, and at the same time to ensure always a good connection, the clamping rings consist of cylindrical casings, which are preferably internally provided with screw threads, a portion of the wall of the casings, forming a number of radially projecting axially running double walled flanges or wings, which match loosely in recesses of the walls of the cylindrical borings in the insulating body, so that the clamping rings can be caught by the insulating body or cap while effecting the connection.

In order to prevent the dropping out or loosening of the insulating body, the open end of the latter can be provided with a closing ring, having a central opening for the introduction of the preferably intertwisted wire ends. The clamping rings can never get lost with this construction and can moreover easily be removed with the cap when inspecting the wiring.

In order that the invention may be clearly understood the same will now be described by way of example, with reference to the accompanying drawing, in which:

Fig. 1 shows a vertical cross section of the wire connector without clamping rings, Fig. 2 shows a bottom view of the wire connector according to Fig. 1 clamping rings and closing ring being removed, Fig. 3 is a top view of a clamping ring used in connection with the wire connecting device;

Fig. 4 is a top view of another clamping ring of a larger diameter applicable in accordance with the invention;

Fig. 5 is a side view of the clamping ring illustrated in Fig. 4.

The wire connector according to the drawing consists mainly of an insulating body 1, which is adapted to contain both the cylindrical clamping rings 2 and 3, each of which is provided with two wings 4, 5, 6, and 7, respectively. A closing ring 8 may be provided to be threaded into said body 1.

Generally a wire connector has to satisfy the conditions that two or more wire ends of even different diameters can be connected thereby. This cannot easily be obtained in practice with closed cylindrical clamping rings, as in practice, it is inconvenient to make or have a clamping ring for each special case. Therefore with the wire connector made according to the invention, the cylindrical clamping rings 2 and 3 are each provided with the double walled wings 4, 5, 6, 7, respectively. The rings 2 and 3 are internally provided with screw threads. If in the rings 2 and 3 there are screwed wires or a twisting of wire ends of a larger external diameter than the internal diameter of at least one of the rings, that ring will be able to expand because the walls of the double walled wings can give way. The rings remain, however, internally cylindrical under all circumstances so that a good contact between the rings and the wires is ensured.

As the difference in diameter of two or more twisted wires can be so great that one ring can no longer take up this difference, two clamping rings 2 and 3 of different dimensions are applicable to this wire connector, which can each take up a certain number of wires. Ring 2, for instance, could take up two or three wires, ring 3, for instance, four or five wires. Of course it is possible to make provision for more than five wires.

The extent of the cylindrical chambers 9 and 10 in insulating cap 1 is such as to accommodate the clamping rings and as many such chambers may be used as there are clamping rings. Each chamber contains two recesses 11 and 12 lying opposite to each other and serving to take up the wings 4—5 and 6—7 of the clamping rings 2 and 3.

A closing ring 8, preferably of insulating material, which can be screwed into the cap 1 after the rings 2 and 3 have been inserted into the cap, prevents loosening of the rings of the cap. Furthermore ring 8 is provided with a central opening 13 through which the wires can be inserted into the rings.

If the wires are introduced through the opening 13 into one of the rings 2 or 3, and the cap 1 is turned and at the same time the wire ends slightly pressed upon, then the recesses 11 and 12 in the cap 1 will catch the wings 4—5 and 6—7 of the rings 2 and 3, so that the rings are screwed over the wire ends.

The invention is not limited to the construction shown and described and many other constructions and modifications are possible without departing from the invention. Thus for instance the rings need not be threaded internally; furthermore, as already mentioned, it is not necessary per se that the rings are expandable and that they are provided with double walled flanges; so for instance the rings may have the shape of a nut engaging in correspondingly shaped borings of the insulating body or cap. In this case of course the walls of the borings in the cap need not to be provided with recesses.

Having thus described the invention, I claim:

1. A wire connecting device comprising an insulating body provided with a plurality of coaxial bores of different diameters, each bore having lateral slots communicating therewith, and a clamping member, said member being internally threaded and externally provided with projections respectively engageable with said slots upon threaded engagement of a plurality of twisted wire ends with said member.

2. A wire connecting device comprising an insulating body provided with a plurality of coaxial bores each of different diameter and having lateral slots communicating with said bores respectively, and a clamping member for engagement with one of said bores, said member being provided with radially projecting double walled flanges respectively engageable in said slots of said one bore upon engagement of a plurality of twisted wire ends with said member.

3. A wire connecting device comprising an insulating body provided with a plurality of coaxial bores each of different diameter, and having an open end, said body having slots communicating with said bores respectively, a clamping ring selectively positioned in one of said bores, said ring being internally threaded for engagement with a plurality of twisted wire ends, and a member for retaining said clamping ring and threadedly engageable with said open end of said body.

4. A wire connecting device comprising an insulating body provided with a plurality of coaxial bores each of different diameter and having slots respectively communicating with said bores, and expandible clamping members provided with lateral projections for sliding engagement with said bores and registrable respectively with said slots, said clamping members being adapted to receive therein a plurality of twisted wire ends.

5. A wire connecting device comprising an insulating body provided with a bore and having guideways communicating with said bore, and an expandible clamping member, said member having a central threaded bore and lateral extensions provided with V-shaped slots communicating with said threaded bore, said threaded bore for grippingly receiving twisted wire ends, said extensions engaging said guideways respectively and permitting said member to expand upon engagement of said wire ends therewith.

WILHELM ALBERT RUDOLPH MEYER.